United States Patent [19]
Royster

[11] Patent Number: 6,135,309
[45] Date of Patent: *Oct. 24, 2000

[54] TILTING CONTAINER SYSTEM

[75] Inventor: Randy G. Royster, White House, Tenn.

[73] Assignee: Nashville Wire Products Manufacturing Co., Nashville, Tenn.

[*] Notice: This patent issued on a continued prosecution application filed under 37 CFR 1.53(d), and is subject to the twenty year patent term provisions of 35 U.S.C. 154(a)(2).

[21] Appl. No.: 08/897,331

[22] Filed: Jul. 21, 1997

[51] Int. Cl.[7] .................................................. B65D 90/00
[52] U.S. Cl. ........................................... 220/629; 220/1.5
[58] Field of Search ................................... 220/694, 629, 220/636, 1.5

[56] References Cited

U.S. PATENT DOCUMENTS

| | | | |
|---|---|---|---|
| 235,123 | 12/1880 | Bovey | 220/629 X |
| 1,924,824 | 8/1933 | Yeager | 220/629 X |
| 3,898,873 | 8/1975 | Glassmeyer | 220/1.5 X |
| 4,795,057 | 1/1989 | Pfeiffer et al. | 220/1.5 X |
| 5,368,179 | 11/1994 | Bulle | 220/1.5 |
| 5,806,863 | 9/1998 | Heger et al. | 220/1.5 X |

*Primary Examiner*—Steven Pollard
*Attorney, Agent, or Firm*—Lucian Wayne Beavers Waddey & Patterson

[57] ABSTRACT

A tilting container system suitable for use in the materials handling industry is described. The system includes a wire mesh container; and a pair of support legs pivotally mounted to the container at an end of the container. The support legs are spaced away from each other along the end of the container and are pivotally mounted to the container for movement between a raised and lowered position. The legs support the container in a tilted position when the leg is in a lowered position. The system can also include a pair of legs mounted to the container at an opposite end of the container from the pivotally mounted legs.

28 Claims, 3 Drawing Sheets

TILTING CONTAINER SYSTEM

BACKGROUND OF THE INVENTION

The present invention relates generally to containers used in the materials handling industry. More particularly, this invention pertains to a tilting container system which enables the user to access all the material in a container. This system is particularly applicable to larger containers.

It will be appreciated by those having ordinary skill in the art that it is difficult to access all the materials stored in the containers typically used in the materials handling industry. An example of such a container is a large wire mesh bin which can be used to store a variety of replacement parts, fasteners and other bulk products that are found in a manufacturing facility. To be more practical, such containers are also very large and therefore very difficult to tilt so that the user may reach materials at the bottom of the container.

To this end there have been a series of expensive tilting tables that have been developed. An example of such a tilting table is the E-Z Reach Container Tilter manufactured by Southwork. It is also necessary for the end user to purchase such a table in addition to purchasing the large storage containers.

What is needed, then, is a container system that enables the user to access all the material in the container but which is inexpensive and can be used as part of the container itself. Such a system is currently lacking in the prior art.

SUMMARY OF THE INVENTION

A tilting container system for use in the materials handling industry is described. The system comprising (a) a container; and (b) a leg pivotally mounted to the container for movement between a raised and lowered position; the leg supporting the container in a tilted position when the leg is in the lowered position. Preferably, the container comprises a wire mesh. The end of the leg opposite an end of the leg where the leg is pivotally mounted to the container can be cut off at an angle so as to be flush against a floor when the leg is in the lowered position.

The system can further comprise a leg mounted to the container at an opposite end of the container from the pivotally mounted leg. The system can further comprising a bore formed in the container and a bore formed in the leg at the end of the leg opposite the end of the leg that is pivotally mounted to the container such that the bore in the leg is aligned with the bore in the container when the leg is in a raised position; and a pin, the pin mountable within the bores when the leg is in a raised position. Preferably, the end of the leg where the leg is pivotally mounted to the container is rounded.

The system can further comprise an additional bore formed in the end of the leg that is pivotally mounted to the container, the bore proceeding into the container, the bore adapted to accept the pin when the leg is in the lowered position.

The system can also include a mounting structure attached to the container. In that case, the leg is pivotally mounted to the mounting structure. A pivot pin can be mounted through the leg and through the mounting structure, the pivot pin pivotally mounting the leg to the structure.

Preferably, the leg is mounted at one end of the container. The system can thus also comprise an additional pivotally mounted leg mounted along the same end of the container as the first leg, the second leg spaced away from the first leg. A brace can be mounted between the legs.

Accordingly, it is an object of this invention to provide a tilting container system.

It is a further object of this invention to provide a tilting container system that includes a pivoting leg which enables the container to be supported when it is in a tilted position.

It is a further object of this invention to provide a tilting container that is self-supported.

It is still a further object of this invention to provide a tilting container which allows ergonomic access to all parts or other materials contained inside the container.

It is still a further object of this invention to provide a tilting container system that can be tilted and maintained in a tilted position without having to use a separate piece of equipment such as a tilting table.

It is yet another object of this invention to provide a portable, stable and self-contained tilting container system.

It is still a further object of this invention to provide a tilting container system which allows for a complete access to the parts or other materials stored within the container.

Other objects of this invention will be apparent from the foregoing detailed description.

DESCRIPTION OF THE PREFERRED EMBODIMENTS

Figure 1:
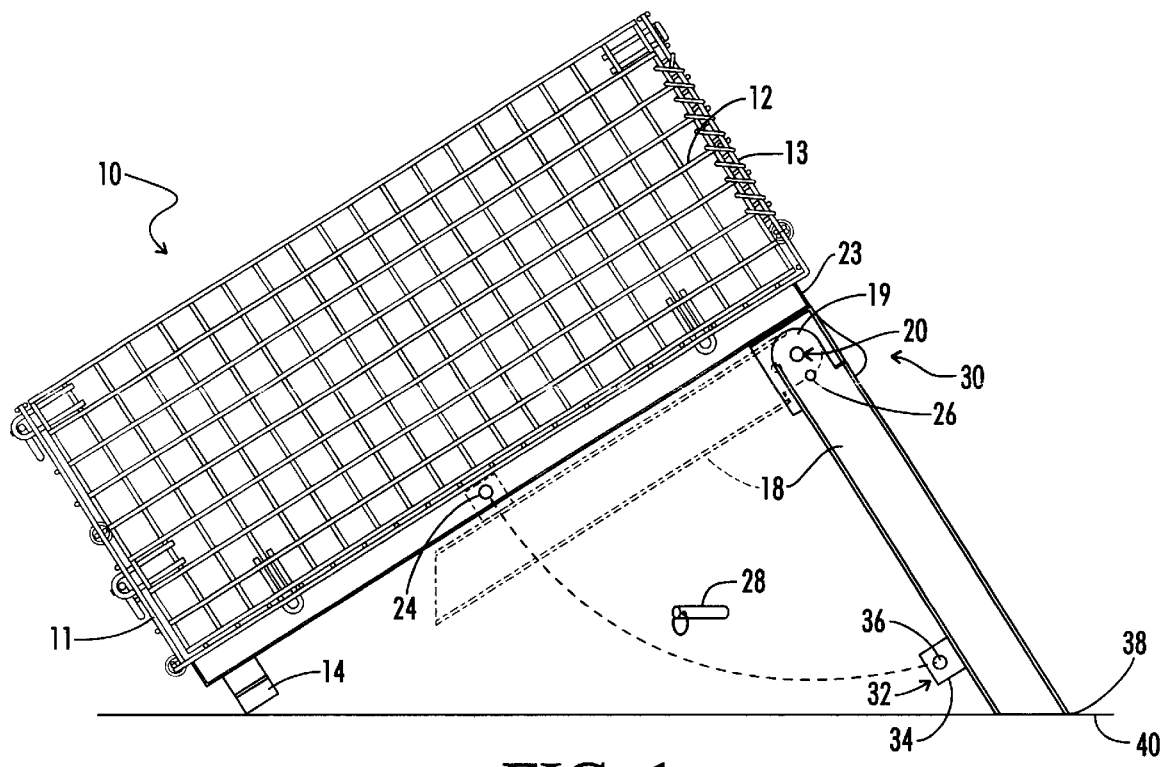
FIG. 1 is a side view of the tilting container system of this invention wherein the container is tilted and the pivoting support leg is in a lowered position.

Referring now to the drawings, wherein like reference numerals refer to like parts throughout, the system of this invention is referred to generally at 10. References are made in the detailed description to right and left; bottom and top; interior and exterior; and front and rear. Such references are made for clarity of the written description, and should not be construed as limitations on the scope of this invention.

Figure 4:
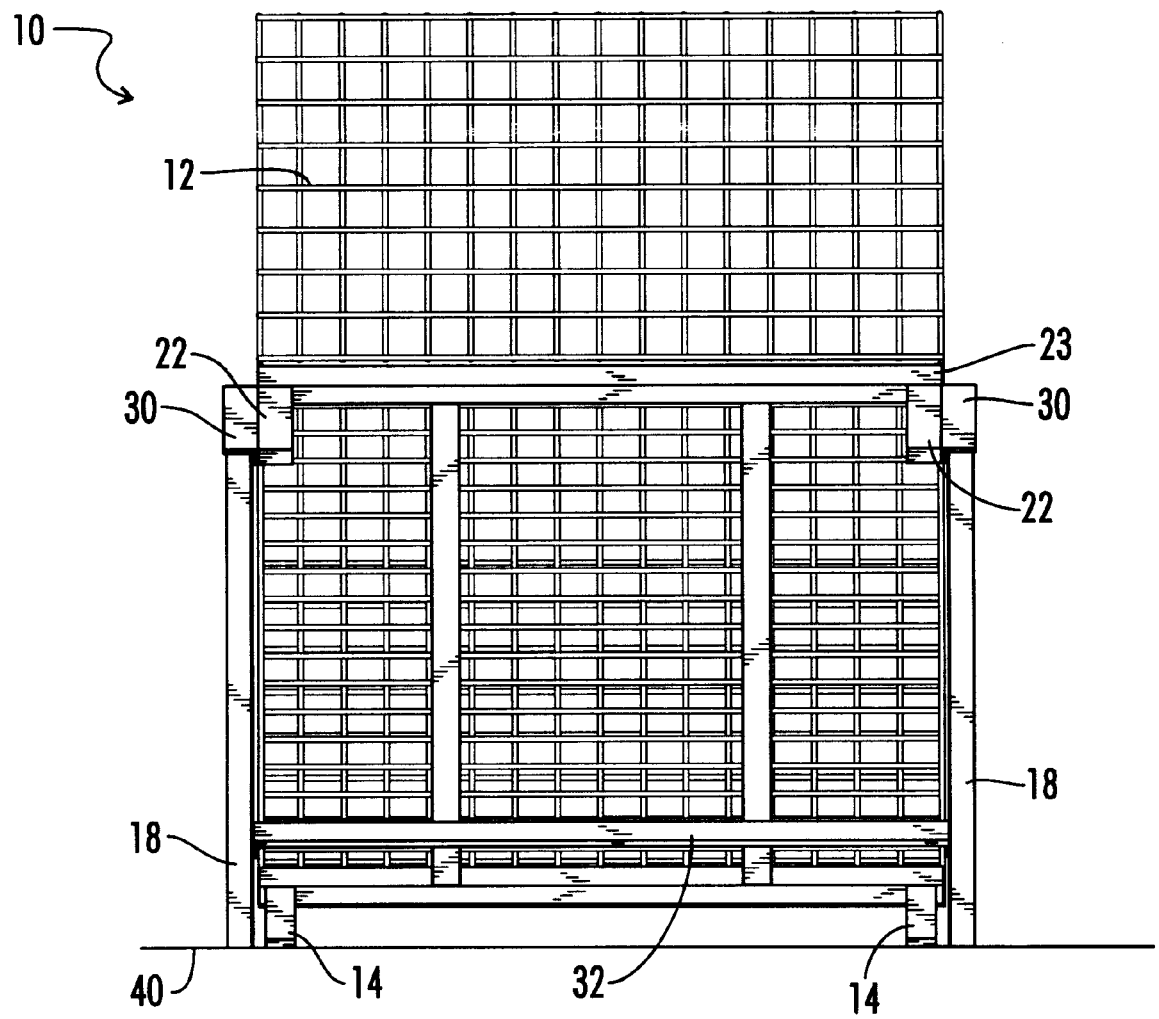
FIG. 4 is a back view of the system of this invention.

Referring now to FIGS. 1 and 4, system 10 comprises container 12 and pivotally mounted support leg 18. A leg mount 22 is welded to the base 23 of container 12 adjacent to the rear end 13 of container 12. Heavy angle 30 is then welded to the exterior surface of leg mount 22.

Figure 2:
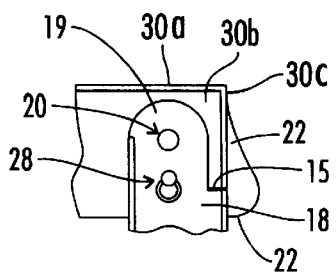
FIG. 2 is a close-up side view of the connection between the support leg and container of the system of this invention.
Figure 3:
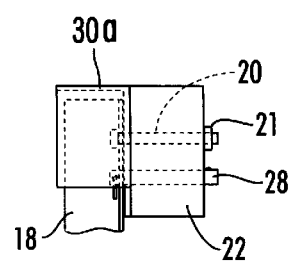
FIG. 3 is a close-up back view of the connection between the support leg and container of the system of this invention.

As best seen in FIGS. 1–3, heavy angle 30 includes three sides, top side 30a, interior side 30b and rear side 30c. Support leg 18 is pivotally mounted to leg mount 22 and heavy angle 30 via swivel pivot pin 20. Swivel pivot pin 20 passes through support leg 18 through interior side 30b of heavy angle 30 and through leg mount 22. Swivel pivot pin 20 preferably also comprises a nut 21 (FIG. 3). The pivoting of leg 18 is facilitated by notch 15 formed in the side edge of leg 18. Notch 15 fits with heavy angle 30 when the leg 18 is in a lowered position. Additionally, end 19 of leg 18 is rounded to facilitate movement within heavy angle 30. Leg 18 is also preferably standard channeled steel and thus is "I" shaped in cross-section.

Figure 1A:
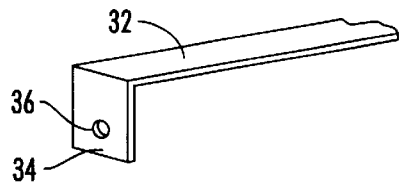
FIG. 1A is a perspective view of the flat brace 32 that is mounted between the support legs in an embodiment of the system of this invention.

Continuing on FIGS. 1, 1A and 4, leg 18 is therefore pivotally mounted via swivel pivot pin 20. In the raised position, shown in phantom in FIG. 1, the leg 18 is secured to the base 23 of container 12 via the interaction of pin 28 through bore 36 and into bore 24. Bore 24 is formed into base 23 of container 12. Bore 36 is formed into flange 34 of flat brace 32, as can be best seen in FIG. 1A. As seen in FIG. 4, brace 32 is mounted between pivoting support legs 18 of system 10.

Referring back to FIGS. 1–3, pin 28 secures leg 18 in the lowered position when it is mounted into bore 26. As best seen in FIGS. 2 and 3, bore 26 is formed through leg 18 and through interior side 30b of heavy angle 30 and through leg mount 22. Heavy angle 30 is welded to base 23 of container 12 along its top side 30a. Heavy angle 30 is welded to leg mount 22 along its back side 30b.

Continuing on FIG. 1, system 10 also includes a front leg 14 to further support container 12 when system 10 is tilted as shown in FIG. 1. As is apparent in FIG. 1, front legs 14 are fixed non-pivoted legs, and are shorter than the pivoted legs 18. Thus, in FIG. 1, when system 10 is in a tilted position, the leg 18 is in a lowered position. End 38 of leg 18 is cut off at an angle to rest flush against floor 40, thus providing stability to system 10. The user can then access all materials within container 12 as the materials proceed toward the front end 11 of the container 12.

Figure 5A:
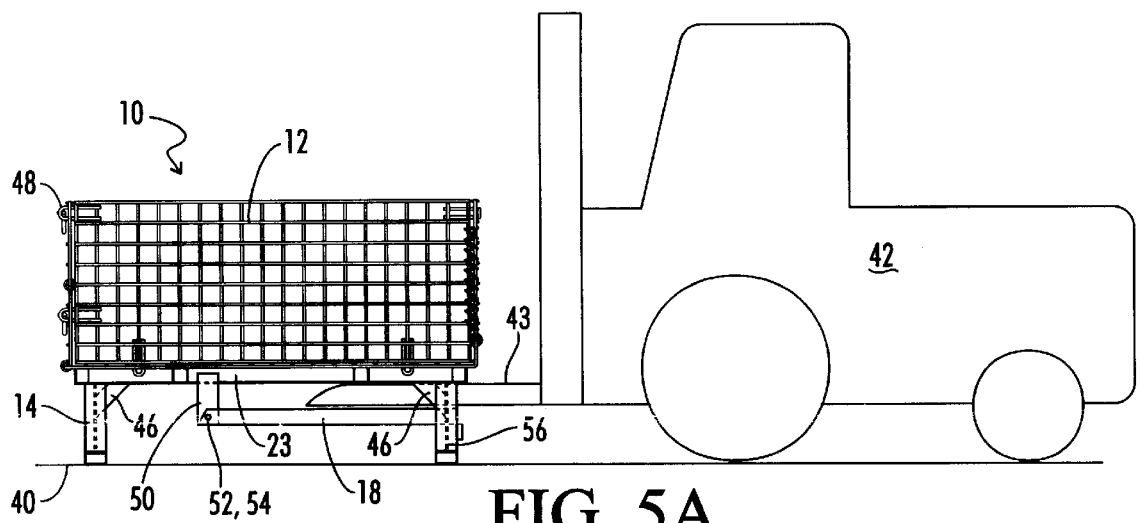
FIG. 5A is a side view of the system of this invention cooperatively interacting with a lift truck but before the system is raised to a tilted position.
Figure 5B:
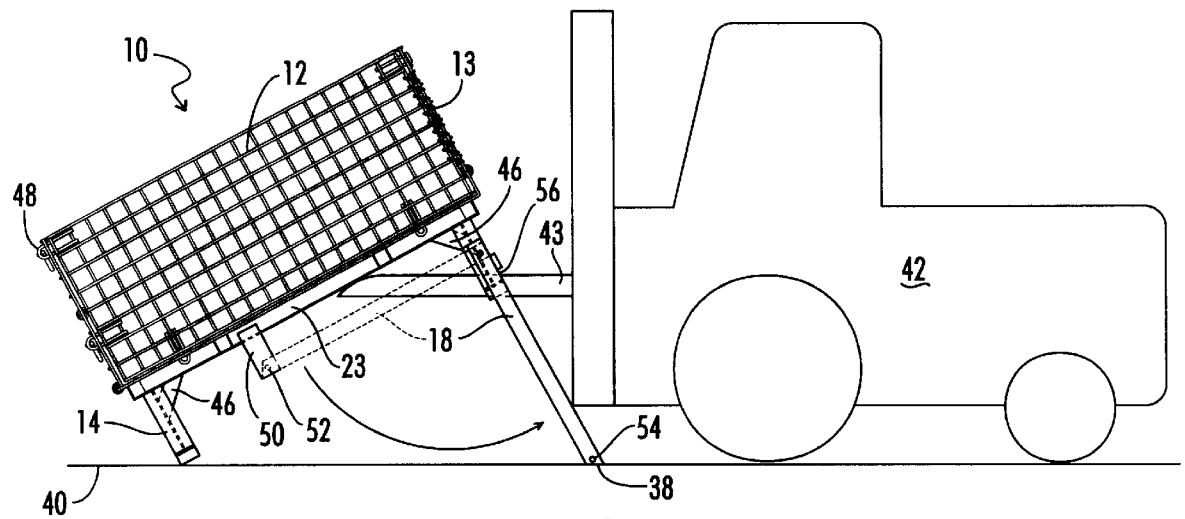
FIG. 5B is a side view of the system of this invention in cooperative interaction with a lift truck where the system is raised to a tilted position and the support leg is placed in a lowered position.
Figure 5C:
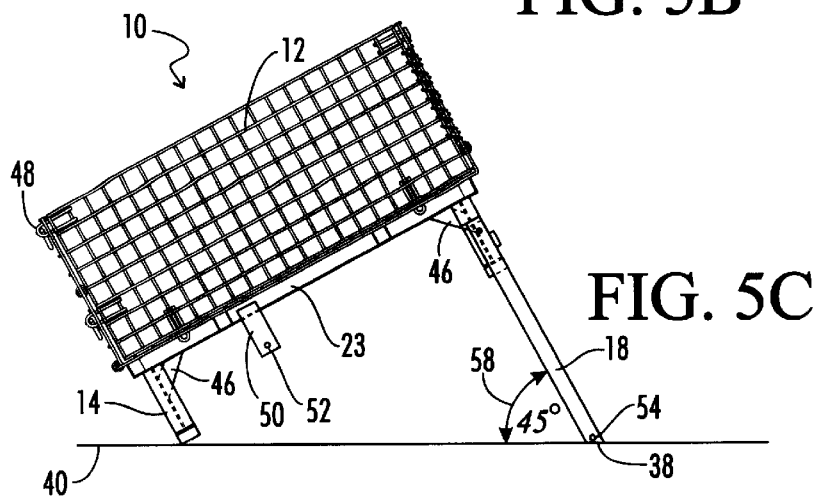
FIG. 5C is a side view of the system of this invention in a tilted position with the support leg of this invention in a lowered position after the lift truck has been removed.

Referring now to FIGS. 5A, 5B and 5C, the mode of operation of the system 10 of the present invention is further described. A lift truck is maneuvered such that tines 43 of lift truck 42 are positioned beneath base 23 of the container 12 of system 10. The embodiment depicted in FIGS. 5A–5C further includes rear leg 56. Support leg 18 is mounted to rear leg 56 in an identical fashion as it is mounted to leg mount 22 as described above, except that support leg 18 is pivotally mounted behind rear leg 56. The support leg 18 of FIGS. 5A–5C may also be referred to as a leg extender 18 for an extendable support member 18. The system also includes braces 46 mounted between base 23 and legs 14 and 56. Finally, the system also includes a door 48 which the user opens to access materials within container 12.

Continuing on FIG. 5A, leg 18 is secured in the raised position by placing a pin 28 through bore 54 and through bore 52 that is formed in mounting stud 50. Thus, in the embodiment depicted in FIGS. 5A–5C, leg 18 is secured in a raised position to mounting stud 50 as opposed to directly to base 23. Stud 50 is welded to base 23.

Referring particularly to FIG. 5B, in continuing to describe the operation of the system in this invention, tines 43 of lift truck 42 are moved to a raised position to tilt container 12 forward. Leg 18 is then pivoted at swivel pivot 20 and placed against floor 40. The foot 38 of leg 18 is cut off at an angle to provide for flush contact with floor 40. This enhances the stability of system 10.

Continuing to FIG. 5C, the fork lift 42 is then removed and the user can then open door 48 to access materials within container 12. In the lowered position of FIG. 5C, leg 18 provides stable support for container 12 in the tilted position so that the user can easily access materials within container 12. Thus, the angle of foot 38 and leg 18 is selected to provide the most suitable stability. A suitable example for the angle between the floor 40 and the leg 18 as provided by the angled end 38 is 45°. This is referred to at 58 in FIG. 5C.

The apparatus of FIGS. 5A–5C and the methods of using the same may be generally summarized as follows.

The container 12 has a front end 11 adjacent the front legs 14 and a rear end 13 adjacent the rear legs 56. The rear and front ends may also be referred to as first and second ends of the container 12.

The rear and front legs 14 and 56 may be described as first and second pairs of fixed legs 56 and 14 extending downward from the first and second ends, respectively, of the container 12 for supporting the container 12 in a level orientation when the first and second pairs of fixed legs 56 and 14 engage a ground surface as shown in FIG. 5A.

The pivotable members 18 may be described as a pair of leg extenders 18 operably associated with the first or rear pair of legs 56 so that the leg extenders 18 can support the container 12 in a tilted orientation as shown in FIG. 5C.

The pair of leg extenders 18 are pivotally attached to the apparatus 10 and are pivotable between their retracted positions as shown in FIG. 5A and their extended positions as shown in FIG. 5C.

The retaining pin 52 may be described as a retaining pin means 52 for pinning the leg extenders 18 in their retracted position of FIG. 5A.

The method of tilting the container 12 which is schematically illustrated in FIGS. 5A–5C may be described as including the steps of:

a. providing the container 12 having the extendable support member 18 at the rear end thereof;

b. initially retaining the support member 18 in its retracted position of FIG. 5A with the retaining pin 52 so that the container 12 rests in a level orientation on the ground surface as shown in FIG. 5A;

c. lifting at least the rear legs of the container off of the ground surface as shown in FIG. 5B;

d. extending the support member 18 to its extended position as indicated in FIG. 5B; and e. lowering the container 12 so that the support member engages the ground surface and holds the rear end of the container higher than the front end of the container so that the container 12 is in a tilted orientation as shown in FIG. 5C.

As shown in the figures of the preferred embodiment, it is preferred that container 12 comprise a wire mesh container as such containers are most commonly used in material handling industries. However, other containers are contemplated to be within the scope of this invention.

Thus, although there have been described particular embodiments of the present invention of a new and useful Tilting Container System, it is not intended that such references be construed as limitations upon the scope of this invention except as set forth in the following claims.

What is claimed is:

1. A tilting container system for use in the materials handling industry for handling bulk quantities of parts, the system comprising (a) a container; (b) a first leg pivotally mounted to the container for movement between a raised and lowered position; and (c) a fixed non-pivotal second leg mounted to the container at an opposite end of the container from the pivotally mounted first leg, the second leg being sufficiently shorter than the first leg so that the first leg supports the container in a tilted position when the first leg is in the lowered position, said tilted position being at a sufficient angle to the horizontal so that the bulk quantities of parts can gravitate toward the lower end of the container adjacent the first leg, whereby a user may reach parts at a bottom of the container.

2. The system according to claim 1 wherein an end of the first leg opposite an end of the first leg where the first leg is pivotally mounted to the container is cut off at an angle non-perpendicular to the length of the first leg so as to be flush against a floor when the first leg is in the lowered position.

3. The system according to claim 1 further comprising a bore formed in the container and a bore formed in the first leg at the end of the first leg opposite the end of the first leg that is pivotally mounted to the container such that the bore in the first leg is aligned with the bore in the container when the first leg is in a raised position; and a pin, the pin mountable within the bores when the first leg is in a raised position.

4. The system according to claim 3 further comprising an additional bore formed in the end of the first leg that is pivotally mounted to the container, the bore proceeding into the container, the bore adapted to accept the pin when the first leg is in the lowered position.

5. The system according to claim 1 wherein the container comprises a wire mesh.

6. The system according to claim 1 further comprising a mounting structure attached to the container, the first leg pivotally mounted to the mounting structure.

7. The system according to claim 6 further comprising a pivot pin mounted through the first leg and through the mounting structure, the pivot pin pivotally mounting the first leg to the structure.

8. The system according to claim 1 wherein the first leg is mounted at one end of the container.

9. The system according to claim 8 further comprising an additional pivotally mounted leg mounted along the same end of the container as the first leg, the additional pivotally mounted leg spaced away from the first leg.

10. The system according to the claim 9 further comprising a brace mounted between the two pivotally mounted legs.

11. The system according to claim 1 wherein an end of the first leg where the first leg is pivotally mounted to the container is rounded.

12. A tilting container system suitable for use in the materials handling industry, the system comprising (a) a container; and (b) a pair of support legs pivotally mounted to the container at an end of the container, the support legs spaced away from each other along the end of the container, the support legs pivotally mounted to the container for movement between a raised and lowered position; the legs supporting the container in a tilted position when the legs are in a lowered position and wherein an end of the legs opposite an end of the legs where the legs are pivotally mounted to the container is cut off at an angle non-parallel to the length of the legs so as to be flush against a floor when the legs are is in the lowered position.

13. The system according to claim 12 further comprising a pair of legs mounted to the container at an opposite end of the container from the pivotally mounted legs.

14. The system according to claim 12 further comprising a pair of bores formed in the container on opposite sides of the container; and a bore formed in the legs at the ends of the legs opposite the end of the legs that are pivotally mounted to the container such that the bores in the legs are aligned with the bores in the container when the legs are in a raised position; and a pair of pins, the pins mountable within the bores when the leg is in a raised position.

15. The system according to claim 14 further comprising an additional bore formed in the ends of the legs that are pivotally mounted to the container, the bore proceeding into the container, the bore adapted to accept the pin when the leg is in the lowered position.

16. The system according to claim 12 wherein the container comprises a wire mesh.

17. The system according to claim 12 further comprising a mounting structure attached to the container, the legs pivotally mounted to the mounting structure.

18. The system according to claim 17 further comprising a pair of pivot pins, the pivot pins pivotally mounting the legs to the structure.

19. The system according to the claim 12 further comprising a brace mounted between the legs.

20. The system according to claim 12 wherein an end of the legs where the legs are pivotally mounted to the container is rounded.

21. A tiltable container apparatus for handling bulk quantities of parts, comprising:
    a container having first and second ends;
    first and second pairs of fixed legs extending downward from the first and second ends, respectively, of the container for supporting the container in a level orientation when the first and second pairs of fixed legs engage a ground surface; and
    a pair of leg extenders, operably associated with the first pair of legs, for increasing a length of the first pair of legs so that the leg extenders can support the container in a tiled orientation, the leg extenders having a length such that when the container is held in its tilted orientation the container is at an angle sufficient that the bulk quantities of parts can gravitate toward a lower end of the container adjacent the second pair of legs, whereby a user may reach parts at a bottom of the container.

22. The apparatus of claim 21, wherein the pair of leg extenders are pivotally attached to the apparatus and are pivotable between a retracted position, wherein the container is supported in a level orientation by the first and second pairs of fixed legs, and an extended position wherein the container is supported in a tilted orientation by the leg extenders and the second pair of fixed legs.

23. The apparatus of claim 21, further comprising a retaining pin means for pinning the leg extenders in their retracted position.

24. The apparatus of claim 21, wherein lower ends of the leg extenders have a sloped supporting surface for engaging the ground when the container is in its tilted orientation.

25. A method of tilting a container to provide better access by a user to bulk quantities of parts in an interior of the container, said method comprising the steps of:

(a) providing a container having an extendable support member at one end thereof;

(b) initially retaining the support member in a retracted position so that the container rests in a level orientation on a ground surface;

(c) lifting the container off of the ground surface;

(d) extending the support member; and (e) lowering the container back onto the ground surface so that the support member holds the one end of the container higher than the other lower end and the container is supported in a tilted orientation at an angle to the ground surface sufficient that the bulk quantities of parts gravitate toward the lower end of the container where the user may access those parts.

26. The method of claim 25, wherein:

step (a) is further characterized in that the extendable support member is pivotally connected to the container; and step (d) includes pivoting the extendable support member downward.

27. The method of claim 26, wherein:

step (b) comprises pinning the support member in its restricted position.

28. The method of claim 25, wherein:

step (c) comprises lifting the container with a fork lift.

* * * * *